United States Patent
Bolesta

[11] Patent Number: 6,076,354
[45] Date of Patent: Jun. 20, 2000

[54] POWER GENERATOR DRIVEN BY ENVIRONMENT'S HEAT

[76] Inventor: Dmytro Bolesta, 9 Jessie Street, Sunshine, VIC 3020, Australia

[21] Appl. No.: 09/068,467
[22] PCT Filed: Aug. 7, 1997
[86] PCT No.: PCT/AU97/00499
  § 371 Date: Aug. 19, 1998
  § 102(e) Date: Aug. 19, 1998
[87] PCT Pub. No.: WO98/11325
  PCT Pub. Date: Mar. 19, 1998

[30] Foreign Application Priority Data

Sep. 9, 1996 [AU] Australia ............... 65534/96

[51] Int. Cl.[7] .................................. F01K 27/00
[52] U.S. Cl. ............... 60/641.1; 415/206; 415/207
[58] Field of Search ............... 60/641.1; 415/80, 415/206, 207

[56] References Cited

U.S. PATENT DOCUMENTS

| | | | |
|---|---|---|---|
| 1,110,302 | 9/1914 | Flatau | 415/80 X |
| 3,930,744 | 1/1976 | Theis, Jr. | |
| 3,976,389 | 8/1976 | Theis, Jr. | |
| 4,150,918 | 4/1979 | Theis, Jr. | |
| 4,164,845 | 8/1979 | Exley et al. | 415/207 X |
| 5,046,480 | 9/1991 | Harris | 415/207 X |
| 5,143,514 | 9/1992 | Adachi | 415/207 X |
| 5,145,317 | 9/1992 | Brasz | 415/207 X |

FOREIGN PATENT DOCUMENTS

| | | |
|---|---|---|
| 26 02 597 | 7/1987 | Germany. |
| WO 96/23140 | 8/1996 | WIPO. |

*Primary Examiner*—Hoang Nguyen
*Attorney, Agent, or Firm*—Larson & Taylor

[57] ABSTRACT

If rotor blades have such form that between them are formed channels which have between their inlets and outlets a narrow cross section, then when the rotor rotates a fluid flowing from the inlet into the narrow cross section accelerates reaching there an increased velocity which is so directed that the reaction of fluid's momentum drives the rotor. The rotor then generates power consuming the fluid's mechanical energy. When the fluid flows from the narrow to increasing cross section of the channel, the momentum is absorbed by the downstream increasing the fluid's pressure. The fluid thus converts its own heat directly into its mechanical energy which equals the sum of the energy which drives the rotor and the kinetic energy of the fluid issuing from the channels, whereat the fluid issuing from the channels is correspondingly cooled.

8 Claims, 6 Drawing Sheets

POWER GENERATOR DRIVEN BY ENVIRONMENT'S HEAT

TECHNICAL FIELD OF THE INVENTION

This invention relates to power generators driven by the heat extracted from the environment.

BACKGROUND ART OF THE INVENTION

The basic art of the invention has been described by the applicant in his international patent application No. PCT/AU94/00482 and published under No. WO 95/07410 on 16.3.95. This invention introduces new kind of constructions of power generators which are better applicable for general use.

SUMMARY OF THE INVENTION

The power generator, according to this invention, consists of a rotor by means of which power is generated by the heat extracted from a fluid which passes through specially formed channels incorporated in the rotor. Said channels have a converging inlet and a diverging outlet. Both said inlet and outlet are connected to each other by their corresponding narrow ends in which the flowing fluid reaches increased velocity when the rotor rotates. The reaction of momentum of the fluid caused by said increased velocity provides the force which drives the rotor and the fluid enters with said increased velocity into said diverging part of the channel in which the momentum of the fluid is absorbed along the channel by the downstream increasing pressure of the fluid. Whereby the fluid passing said diverging part of the channel converts its own heat directly into its mechanical energy, without involving any of the thermal cyclic processes which are used for such conversion today. Said mechanical energy equals the power generated. Consequently, the fluid issues from the rotor correspondingly cooled.

DESCRIPTION OF THE INVENTION

Following constructions of power generators in accordance with this invention will be now illustrated and described by way of example only with reference to the accompanying drawings in which.

In order to describe the concept of this invention clearly it is necessary to use some simple mathematical presentation and also to explain some symbols used in the description.

| | | | | | |
|---|---|---|---|---|---|
| E | = | mechanical energy | m | = | mass of fluid passing channel in unit time. |
| P | = | pressure of fluid | | | |
| V | = | absolute velocity of fluid in relation to the ground. | A | = | cross section area. |
| | | | q | = | density of fluid. |
| W | = | relative velocity of fluid | U | = | rotating speed. |

Figure 1:
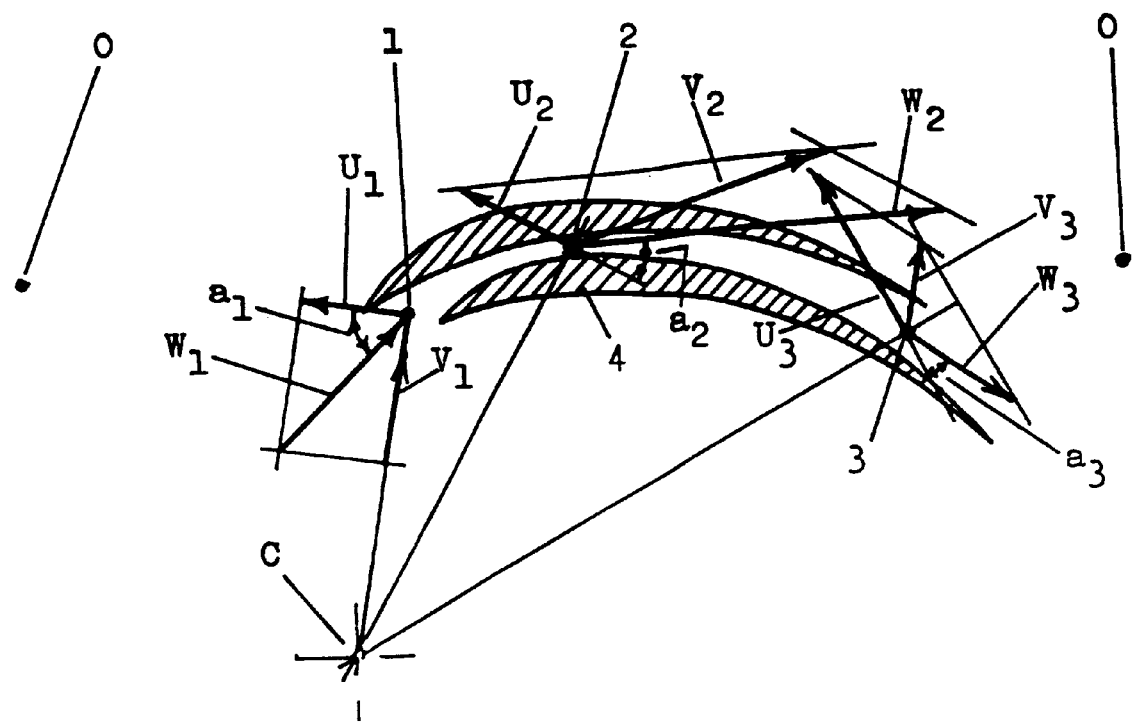
FIG. 1 illustrates one of the rotor's channel for the purpose of clearly describing the concept of the invention.

FIG. 1 illustrates one of the channels, formed between rotor blades 4, through which a fluid flows when the rotor rotates. In order to determine how the fluid acts four points 0, 1, 2 and 3 have been selected. Point 0 depicts a stationary fluid external to the channel which rotates around point C. In line 1 are shown mechanical energies, per unit mass, of In the following equation 1, there are shown the mechanical energies, per unit of mass, of the fluid at three points 0, 2 and 3, and it is here initially assumed that the said fluid is a liquid.

$$E_0=P_0/q \quad E_2=P_2/q+V_2^2/2 \quad E_3=P_3/q+V_3^2/2 \qquad 1$$

Equations 2 show the value of $V_2$ $$V_2^2=(U_2-W_2 \cos a_2)^2+(W_2 \sin a_2)^2=U_2^2+W_2^2-2U_2W_2 \cos a_2 \qquad 2$$

Equation 3 shows the pressure difference between points 3 and 2; because the fluid discharges to external pressure, $P_3=P_0$.

$$(P_3-P_2)/q=(P_0-P_2)/q=\tfrac{1}{2}(U_3^2-U_2^2+W_2^2-W_3^2) \qquad 3$$

Equation 4 shows the difference in energies of the fluid between points 0 and 2, assuming that the fluid enters the channel at a correct angle, as is illustrated in point 1.

$$E_0-E_2=(P_0-P_2)/q-V_2^2/2=(P_0-P_2)/q-\tfrac{1}{2}(U_2^2+W_2^2-2U_2W_2 \cos a_2)=\tfrac{1}{2}(2U_2W_2 \cos a_2+U_3^2)-\tfrac{1}{2}(U_2^2+W_3^2)=U_2(W_2 \cos a_2-U_2)+\tfrac{1}{2}(U_3^2-W_3^2) \qquad 4$$

Equation 4 in its final developed form shows that the magnitude of velocity $W_2$ can make the equation either positive or negative. If it is positive, the fluid has lost its mechanical energy between points 0 and 2. Here this energy has been converted into power, generated by the rotor which then constitutes a power generator. If this equation is negative, an external power must be applied to maintain the rotation and the arrangement constitutes a pump or a compressor. Velocity $W_2$ can be controlled by the size of the cross sectional area of the channel in point 2.

Equation 5 shows the difference in mechanical energies of the fluid in points 3 and 2.

$$E_3-E_2=(P_3-P_2)/q+V_3^2/2-\tfrac{1}{2}(U_2^2+W_2^2-2U_2 \cos a_2)=\tfrac{1}{2}(2U_2W_2 \cos a_2+U_3+V_3^2)-\tfrac{1}{2}(2U_2^{22}+W_3^3)=U_3(U_3-W_3 \cos a_3)+U_2(W_2 \cos a_2-U_2) \qquad 5$$

This equation shows that the mechanical energy of the fluid in point 3 is larger than in point 2 when the equation in line 4 is positive. The equation in its final developed form consists of two components: the first component is mechanical energy expended to overcome the reaction of the tangential component of issuing velocity $V_3$ and this energy is absorbed by the fluid; the second component represents the energy which the fluid supplies by converting its own heat directly into the mechanical energy and by this amount the fluid is cooled.

Equation 6 in its developed form determines the power generated by the rotor, $E_r$.

$$Er=E_0-E_2-U_3(U_3-W_3 \cos a_3)=U_2(W_2 \cos a_2-U_2)-\tfrac{1}{2}V_3^2 \qquad 6$$

This equation shows that the fluid issues from the rotor with velocity $V_3$ and this kinetic energy can be converted into power by a turbine or it can be converted into pressure by directing the fluid through a diffuser making a power generator and a pump. If the work consumed by the pump equals the power generated, by selecting a required velocity $W_2$, then such arrangement will constitute a self-driven pump. Consequently, it is here possible to make a pump or a compressor partially or fully driven by the heat of the pumped fluid. Also it is here possible to convert a power generator during its working into a power consumer. Such arrangement is illustrated on FIG. 4 and FIG. 5 and it is especially suitable for propulsion of vehicles, being used for both driving and braking.

Figure 1A:
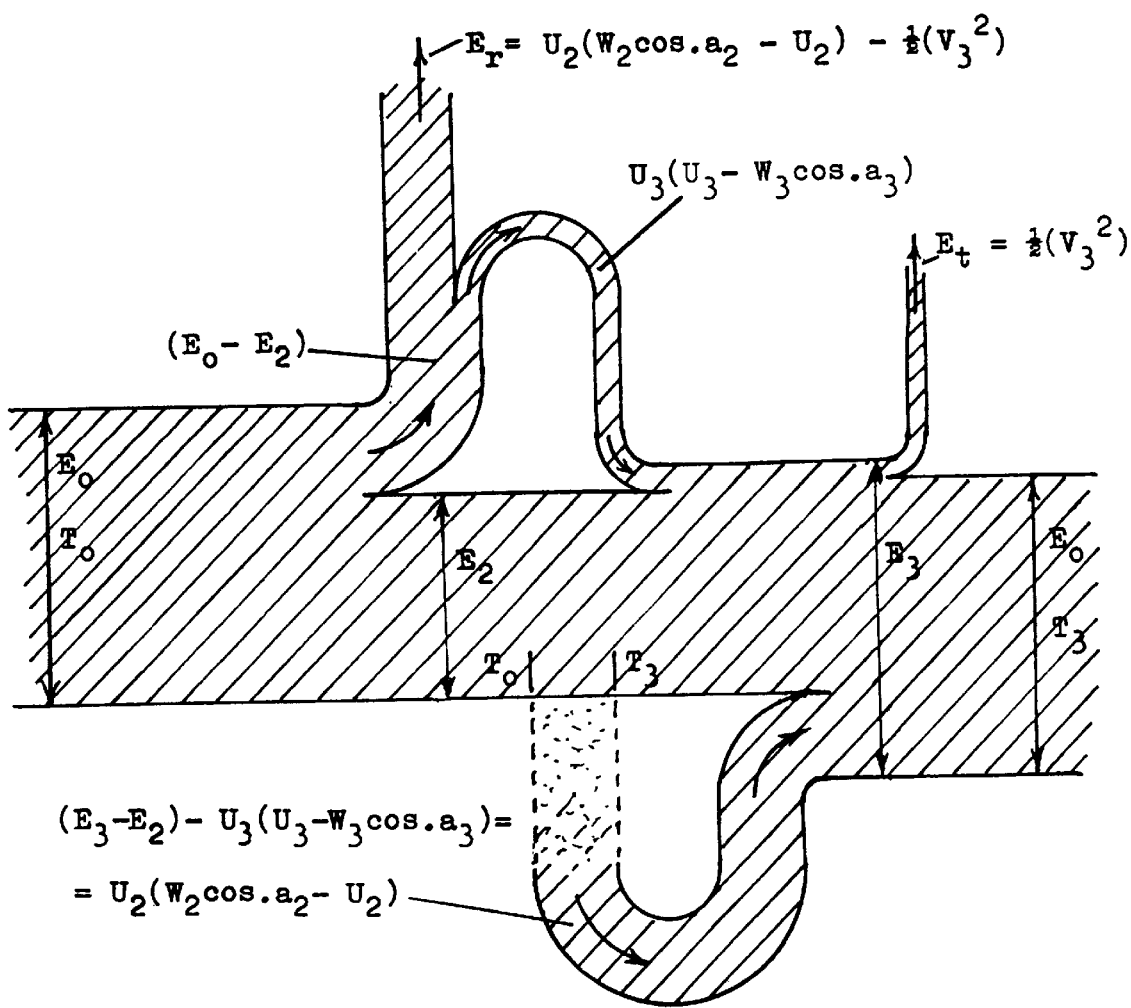
FIG. 1a is a flow diagram of mechanical energy contained by the fluid while it passes the rotor.

Since in gases $P/q=R.T$ in which R=gas constant and T=absolute temperature, the above presented equations apply also for gases. Therefore working medium which drives the power generator can be a liquid or a gas. Referring to FIG. 1a, which illustrates diagrammatically the flow of mechanical energy defined by equations shown on FIG. 1, the fluid enters the rotor possessing an initial mechanical energy $E_0$ and temperature $T_0$. After a portion of fluid's heat has been converted in diverging part of the channel into mechanical energy the fluid reduces its temperature to $T_3$ prevailng in point 3 and issues at such temperature. The sum of power generated by the rotor, $E_r$, and by the turbine, $T_r$, equals the heat extracted from the fluid.

Figure 2:
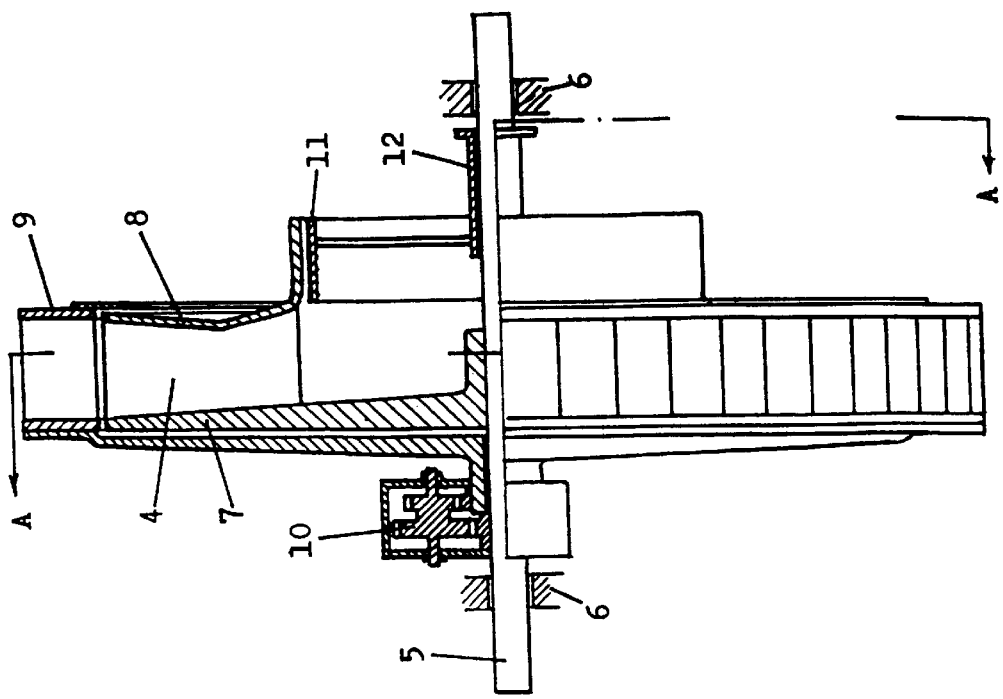
FIG. 2 shows half of longitudinal section and half of side elevation of a power generator having fixed channels.
Figure 3:
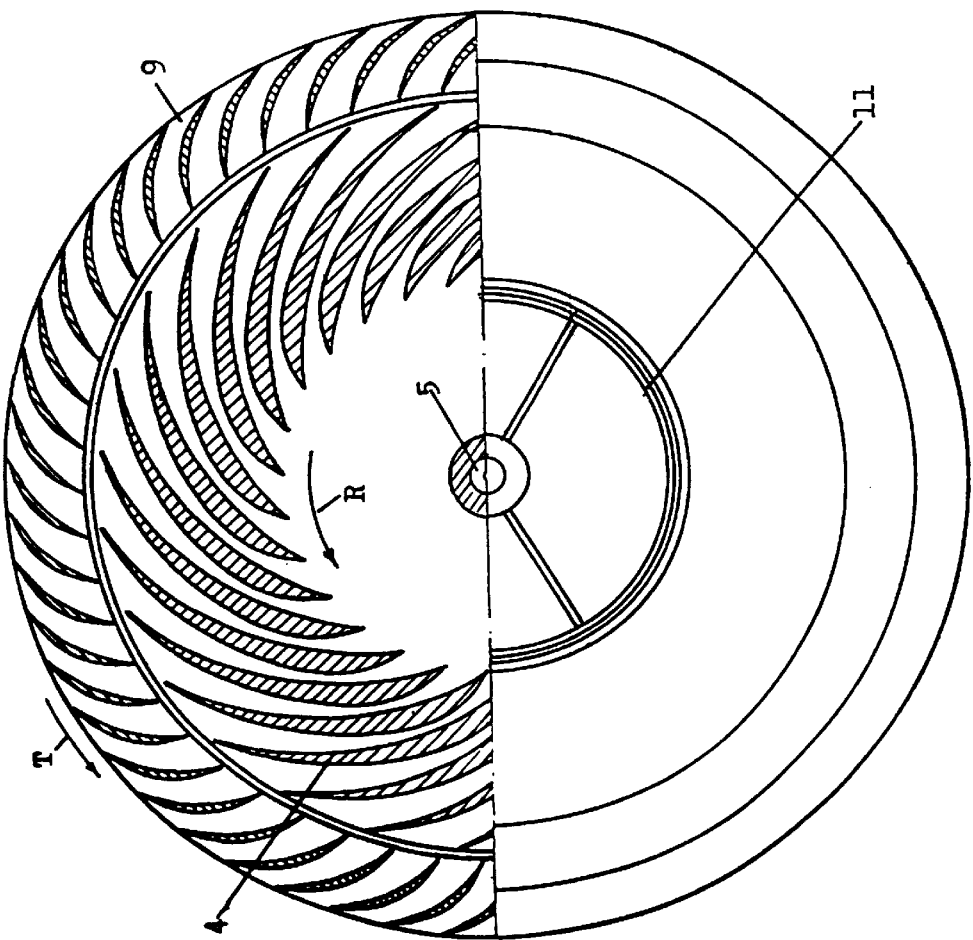
FIG. 3 is a cross section A—A shown on FIG. 2.

Description of power generator shown on FIG. 2 and FIG. 3.

Since the concept of operation has been already described, the description will be limited to the construction of the power generator which comprises a shaft 5, rotating in bearings 6, to which a rotor disc 7 is rigidly connected. Between the disc 7 and curved plate 8 are solidly fixed rotor blades 4. Shaft 5, disc 7, plate 8 and the rotor blades 4 constitute the rotor by means of which power is generated and the heat is extracted from the fluid which flows through the channels formed between the rotor blades 4. At the outlet of the rotor is arranged turbine 9 for converting kinetic energy of the fluid issued from the channels into power which is transmitted to the shaft 5 by means of transmission 10. Both, the rotor and the turbine rotate in the same direction but at different speeds, the turbine rotates slower than the rotor. Arrows R and T indicate the rotating direction.

Power output of the generator is controlled by ring 11 which can be moved by sleeve 12 and obstruct fully or partially the entry into the channels. Sleeve 12 can be moved by a suitable conventional governor or manually. Side plate 8 is bent towards the rotor blades to cause by this an additional reduction of cross section area of the channel in point 2, shown on FIG. 1, in order to increase the velocity $W_2$ which influences power output. Rotor blades have one side convex and the other concave and normally are located in the rotor so that the convex side faces the direction of rotation.

Figure 4:
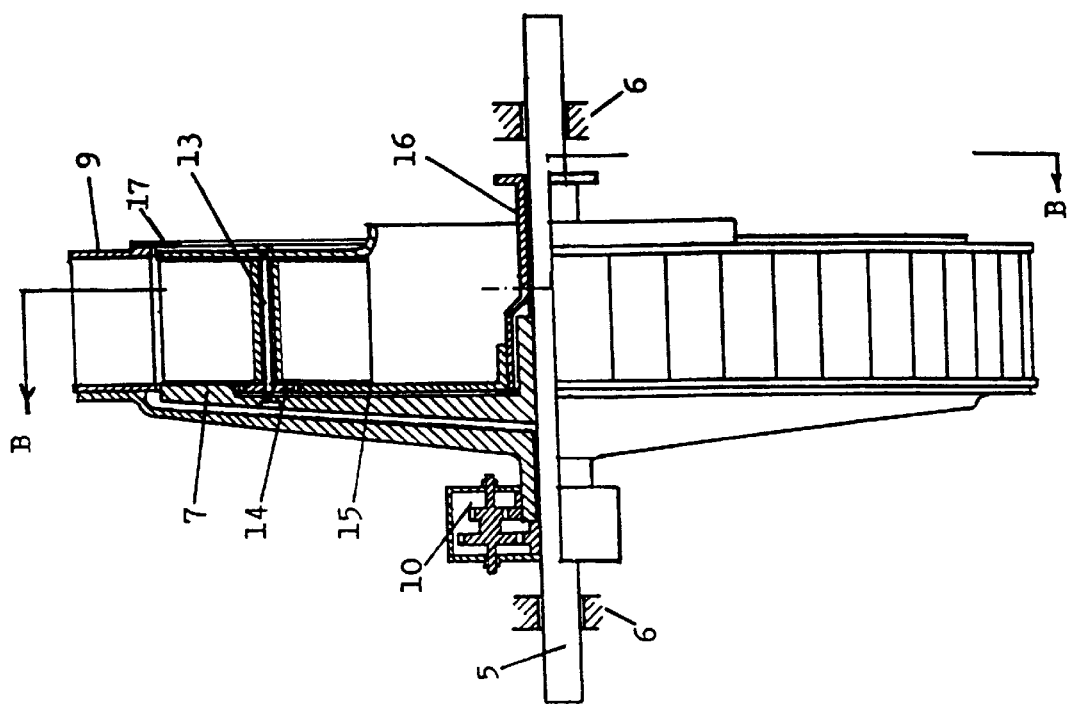
FIG. 4 shows half of longitudinal section and half of side elevation of power generator having adjustable channels.
Figure 5:
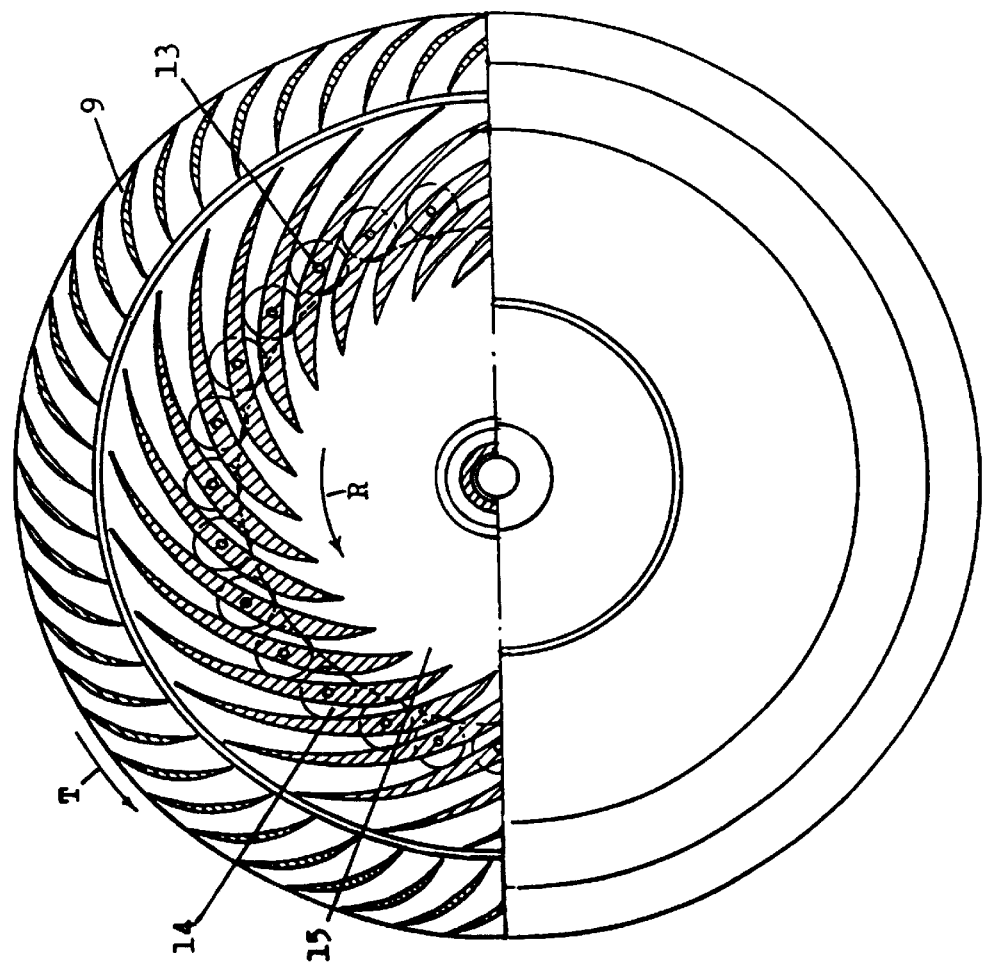
FIG. 5 is a cross section B—B shown on FIG. 4.

Description of engine shown on FIG. 4 and FIG. 5.

This engine is similar in construction as the described generator shown on FIG. 2 and FIG. 3 except that here the rotor blades 4 are arranged rotary around their axis 13. To effect said rotation, to each rotor blade is rigidly connected gear 14 which engages with gear 15 which can be rotated by sleeve 16 and by this rotate all rotor blades at the same time. In order to reduce resistance to the fluid flow, gears 14 and 15 are recessed in disc 7. By rotating the rotor blades the narrow cross section of channels, point 2 on FIG. 1, can be changed or completely closed and stop by this the engine. Sleeve 16 can be rotated by a conventional governor or manually.

Referring to the equation shown in line 6 on FIG. 1, by changing the cross section area of the channel in point 2, velocity $W_2$ will change changing the equation which can be either positive or negative. This means that the engine can be either a power generator or a power consumer. Such engine is especially suitable for the propulsion of vehicles like cars since it can be used for both driving and braking. Turbine 9 converts a substantial portion of kinetic energy of the fluid, issued from the rotor, into power and transmits it to the shaft 5 through transmission 10. Gland 17 prevents the fluid escaping through the gap between the rotor and the turbine.

Figure 6:
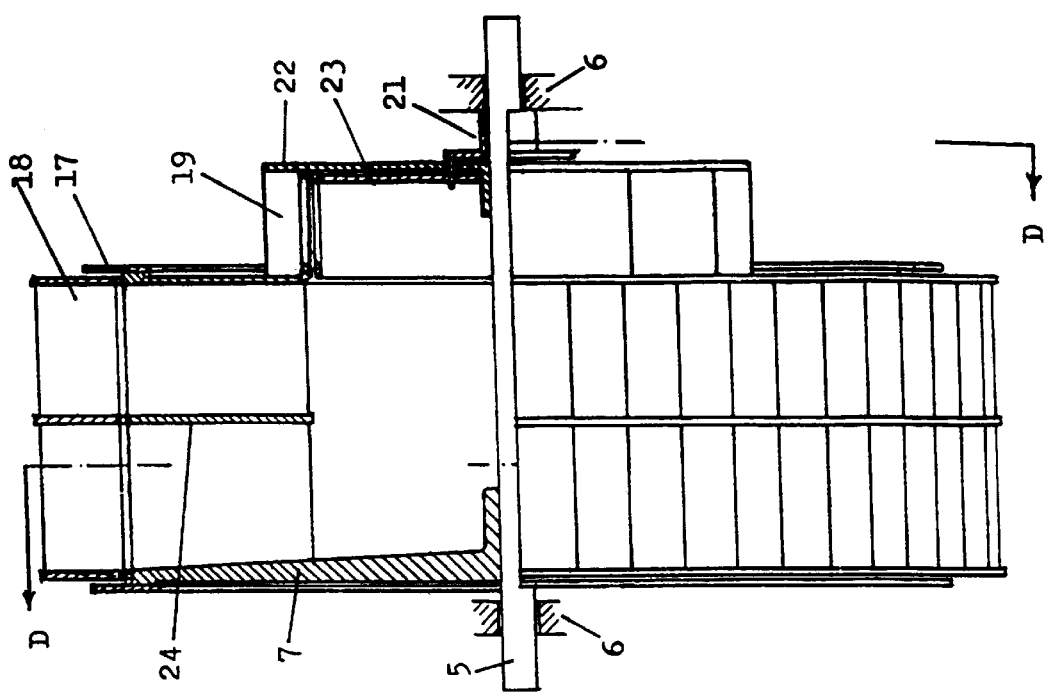
FIG. 6 shows half of longitudinal section and half of side elevation of a power generator suitable for larger power output.
Figure 7:
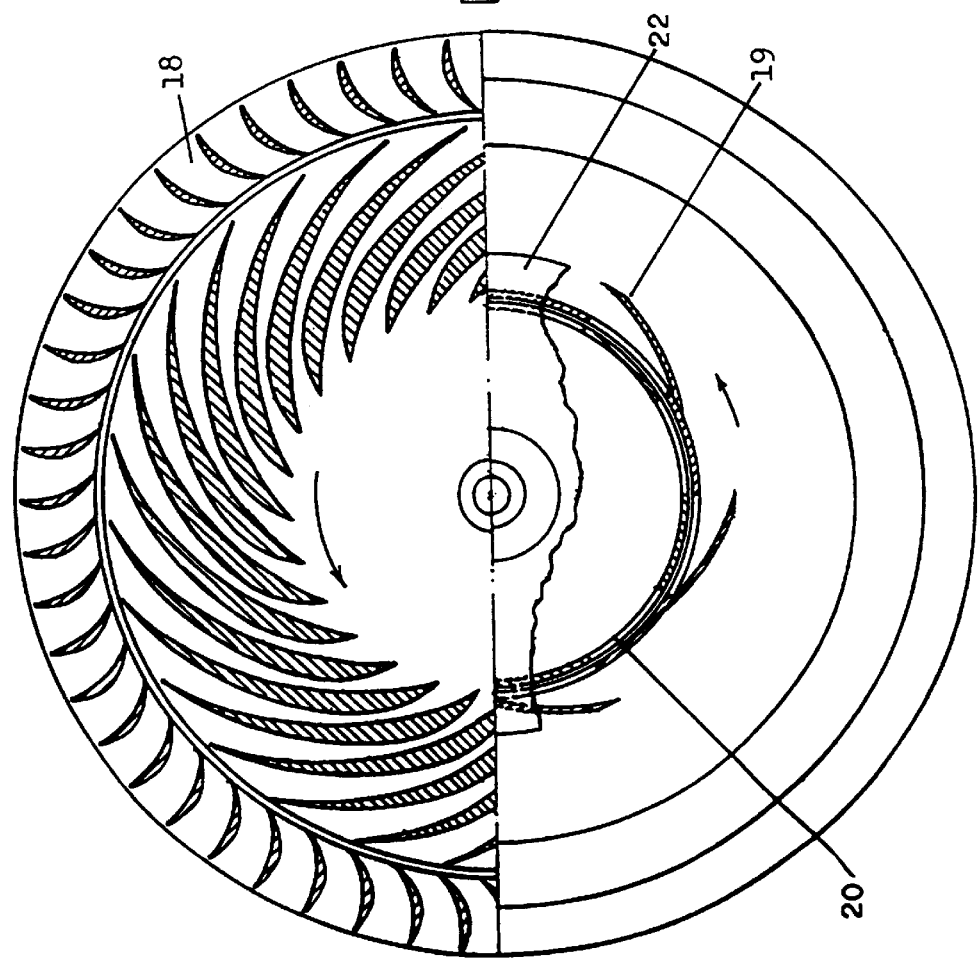
FIG. 7 is a cross section D—D shown on FIG. 6.

Description of power generator shown on FIG. 6 and FIG. 7.

This power generator comprises a similar rotor as already described and shown on FIG. 3. Turbine 9 has been here replaced by a stationary diffuser 18 which converts kinetic energy of the fluid into pressure. Dynamic gland 17 prevents external fluid to enter through the gap into the diffuser. Fluid enters the generator through a scoop 19. The entry can be partially or totally closed by ring 20, shown on FIG. 7 in closed position. By this the generator can be stopped or its power output controlled. Ring 20 is operated by sleeve 21 which connects through a slotted hole in the scoop wall 22 with the disc 23 wich is connected with the ring 20. The generated power is transmitted by disc 7 to the shaft 5 which rotates in the bearings 6.

By making the rotor blades deep, as is shown in longitudinal section on FIG. 6, the generator can generate larger power. The limits is determined by the centrifugal force acting on the blades. Disc 24 is inserted to take up the centrifugal forces. Also, in order to reduce said centrifugal forces, the blades will be made, preferably, hollow, like being fabricated from a thin sheet metal.

If the fluid is discharged from the vane ring 18 into an external fluid which has the same pressure as the fluid entering the generator then only the power will be generated. If the fluid is discharged into a pressure container then such an arrangement will constitute a power generator and a pump or a compressor. The magnitude of the velocity $W_2$ determines the ratio of power generated to velocity $V_3$ which is converted into pressure. Said velocity $W_2$ can be so selected, by the size of cross section area, that said pump or compressor is fully or partially driven by the rotor which is in this case driven by the heat of pumped fluid.

If desired the vane ring 18 can be substituted by a volute casing as is used in conventional pumps.

Figure 8:
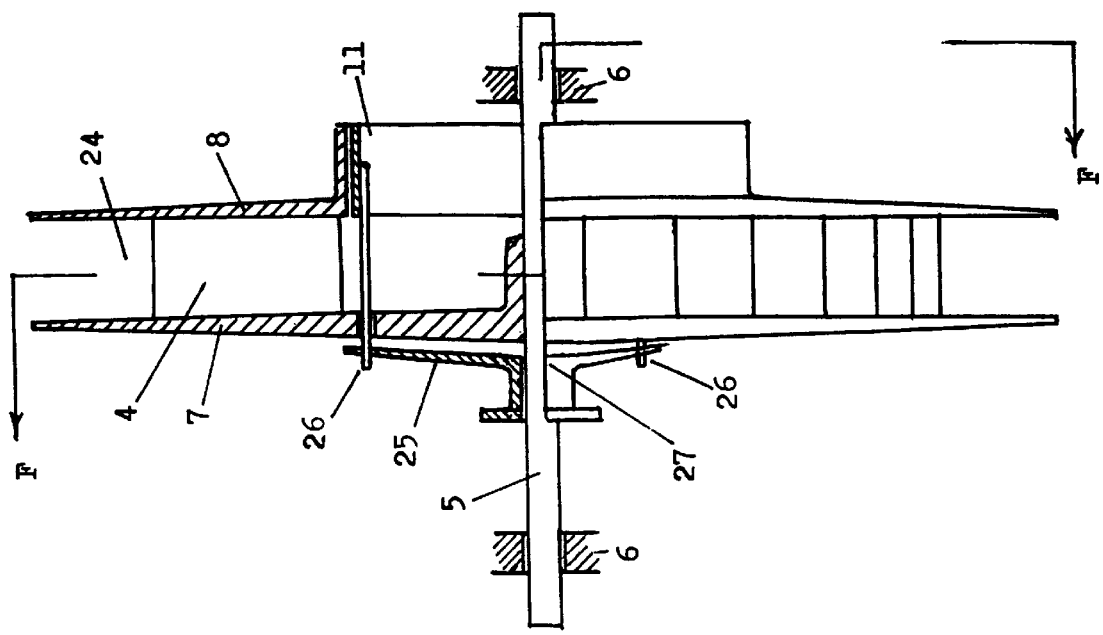
FIG. 8 shows half of longitudinal section and half of side elevation of a power generator having a diffuser rotating with the rotor.
Figure 9:
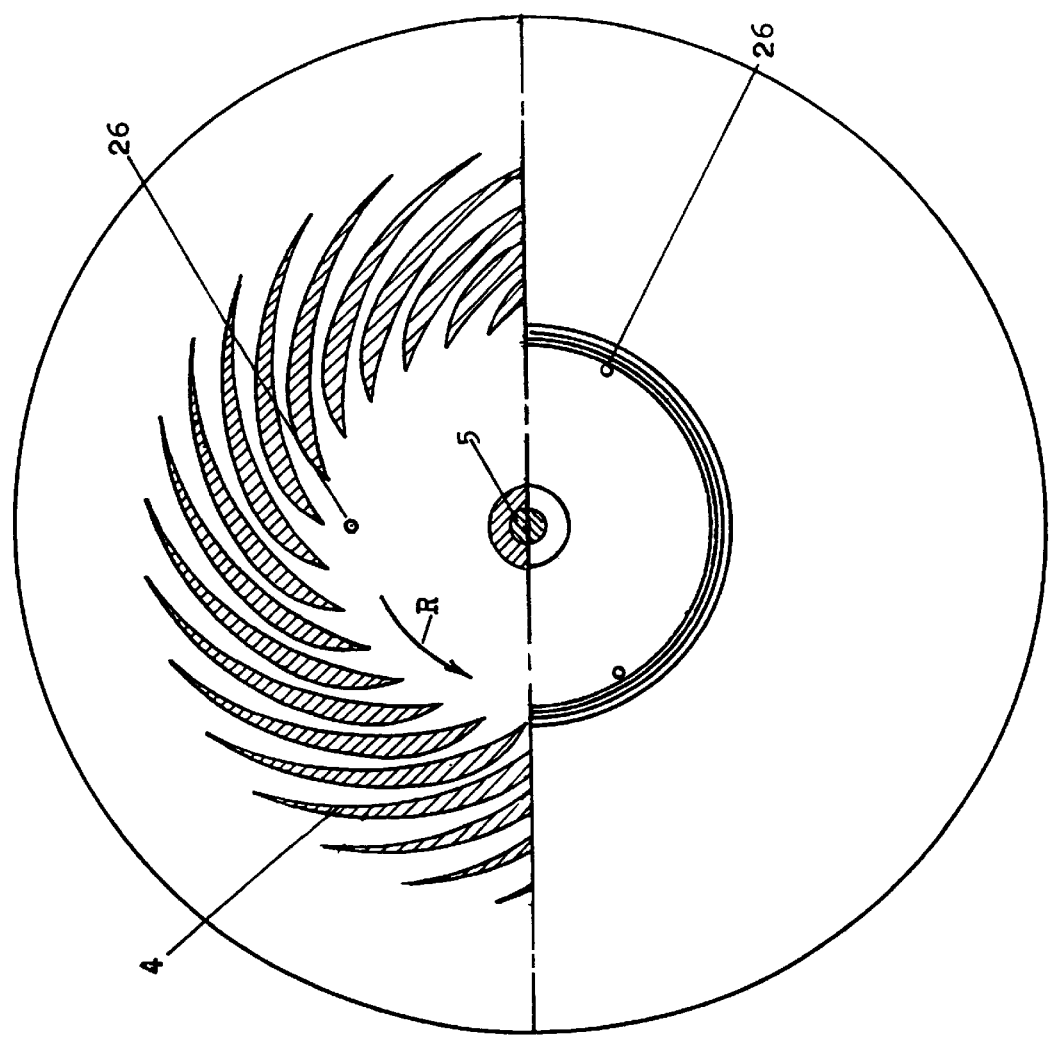
FIG. 9 is a cross section F—F shown on FIG. 8.

Description of power generator shown on FIG. 8 and FIG. 9.

The rotor is of similar construction as is shown on FIG. 2 except that the side discs 7 and 8 are made with a diameter larger than the outside diameter of the channels forming between them a bladeless diffuser 24 which rotates with the rotor. The rotating turbine ring 9 being now omitted. Power output is controlled by ring 11 which rotates with the rotor and is connected with arms 25 by rods 26 which connect arms 25 through holes in the disc 7. Arms 25 are connected with sleeve 27 which can be moved along the shaft 5 and close partially or fully the entry into the rotor channels. Sleeve 27 can be moved manually or by a suitable governor.

The herewith described and illustrated power generators may be changed or amended to suit particular requirements. The illustrated elements of power generators are interchageable if preferable or required.

What is claimed is:

1. A power generator generating power by the heat supplied by a fluid employed in the power generator as a working medium whereat said heat is totally converted into power without any of the heat being rejected at said conversion, and the claimed power generator is characterized by its construction which comprises a rotor by which power is generated and a direct conversion of heat into mechanical energy is effected and said rotor is provided with streamlined and backwardly to rotation curved blades so that between adjacent blades a channel is formed which has along a length thereof a varying cross sectional area so that a fluid can flow through the channel changing along the channel its pressure and velocity and the channel has between its inlet and its outlet a narrower cross sectional area so that during rotation of the rotor the fluid flowing through the channel accelerates between the inlet and said narrower cross sectional area in which the fluid reaches a maximum velocity which is so directed by the channel that the reaction of the fluid's momentum, caused by said maximum velocity, drive the rotor and when the fluid further flows between said narrower cross sectional area and the outlet of the channel the fluid decelerates absorbing said momentum by its downstream increasing pressure whereat the fluid converts its own heat directly into its mechanical energy which normally equals the sum of the energy which drives the rotor and the difference in mechanical energies the fluid has at the outlet and had before the inlet of the channel whereat the fluid is induced by the rotation of the rotor to enter and flow through the rotor's channels and since the fluid's heat has been converted into mechanical energy in the channels, the fluid issues from the channels with a correspondingly reduced temperature.

2. A power generator accord ing to claim 1 in which the said fluid is taken from environment and after a portion of its heat has been converted into power by said power generator, the cooled fluid is exhausted back into the environment.

3. A power generator according to claim 1 in which said rotor blades are arranged rotative around axles which are located in such a way that the said narrower cross section of the channel can be changed by rotaing the blade around said axle and said rotation is caused by means of a gear located concentrically to said axle and rigidly connected to the blade and said gear engages with a common to all blades gear which is arranged concentrically to the shaft of the rotor so that by the rotation of said common gear around the rotor shaft all blades of the rotor are rotated at the same time.

4. A power generator according to claim 1 in which said rotor blades are formed so that their one side is concave and the opposite site convex and the blades are located in the rotor so that the convex side faces the direction of rotation of the rotor.

5. A power generator according to claim 1 in which is added a turbine which converts the energy contained by the fluid issuing from the rotor into power.

6. A power generator according to claim 1 in which the fluid issued from the channels of the rotor is directed through a diffuser by means of which the kinetic energy contained by the fluid is converted into power by causing a lower pressure at the outlets of the channels.

7. A power generator according to claim 1 in which the fluid issued from the rotor is directed through a diffuser by means of which kinetic energy of the fluid is converted into fluid's pressure constituting by this a pump driven by the energy generated by said rotor.

8. A power generator according to claim 1 in which the fluid issued from the rotor is directed through a diffuser by means of which kinetic energy of the fluid is converted into fluid's pressure constituting by this a gas compressor driven by the energy generated by said rotor.

* * * * *